(12) United States Patent
Yang et al.

(10) Patent No.: US 11,576,101 B2
(45) Date of Patent: Feb. 7, 2023

(54) AIR INTERFACE INACTIVE STATE MAINTAINING METHOD AND DEVICE

(71) Applicant: ZTE CORPORATION, Shenzhen (CN)

(72) Inventors: Li Yang, Shenzhen (CN); Jing Liu, Shenzhen (CN); Zijiang Ma, Shenzhen (CN)

(73) Assignee: ZTE CORPORATION, Shenzhen (CN)

(\*) Notice: Subject to any disclaimer, the term of this patent is extended or adjusted under 35 U.S.C. 154(b) by 12 days.

(21) Appl. No.: 17/054,116

(22) PCT Filed: Apr. 25, 2019

(86) PCT No.: PCT/CN2019/084341
§ 371 (c)(1),
(2) Date: Nov. 9, 2020

(87) PCT Pub. No.: WO2019/214450
PCT Pub. Date: Nov. 14, 2019

(65) Prior Publication Data
US 2021/0120475 A1    Apr. 22, 2021

(30) Foreign Application Priority Data

May 9, 2018   (CN) .......................... 201810438746.9

(51) Int. Cl.
*H04W 36/32*     (2009.01)
*H04W 76/11*     (2018.01)
(Continued)

(52) U.S. Cl.
CPC ....... *H04W 36/32* (2013.01); *H04W 36/0058* (2018.08); *H04W 36/0069* (2018.08);
(Continued)

(58) Field of Classification Search
CPC ......... H04W 36/0011; H04W 36/0033; H04W 36/0058; H04W 36/0069; H04W 36/08;
(Continued)

(56) References Cited

U.S. PATENT DOCUMENTS

2015/0271726 A1\*  9/2015  Kim ...................... H04W 76/15
                                                          370/329
2016/0066255 A1    3/2016  Marinier et al.
(Continued)

FOREIGN PATENT DOCUMENTS

CN        1866924 A     11/2006
CN      104469869 A      3/2015
(Continued)

OTHER PUBLICATIONS

International Search Report for Application No. PCT/CN2019/084341, dated Jul. 8, 2019, 4 pages.
(Continued)

*Primary Examiner* — Quoc Thai N Vu
(74) *Attorney, Agent, or Firm* — Morgan, Lewis & Bockius LLP

(57) ABSTRACT

Provided are method and apparatus for maintaining an air interface inactive state. The method includes: receiving an RRC uplink notification message sent by a UE, the RRC uplink notification message carrying information notifying that the UE is out of coverage of a serving cell under a source secondary node; performing, based on the RRC uplink notification message, a migration operation of a related high-level configuration of a PDU session anchored to the source secondary node by the UE, a migration target node being a target secondary node or a current master node; and sending an RRC downlink reply message to the UE after performing the migration operation of the high-level con-
(Continued)

figuration, and maintaining the UE in a dual-connectivity or single-connectivity air interface inactive state.

13 Claims, 7 Drawing Sheets

(51) Int. Cl.
*H04W 76/27* (2018.01)
*H04W 36/00* (2009.01)
*H04W 92/10* (2009.01)

(52) U.S. Cl.
CPC ............ *H04W 76/11* (2018.02); *H04W 76/27* (2018.02); *H04W 92/10* (2013.01)

(58) Field of Classification Search
CPC ..... H04W 36/32; H04W 36/38; H04W 48/20; H04W 36/305; H04W 76/11; H04W 76/15; H04W 76/18; H04W 76/19; H04W 76/20; H04W 76/27; H04W 92/10
See application file for complete search history.

(56) References Cited

U.S. PATENT DOCUMENTS

| | | | |
|---|---|---|---|
| 2016/0198377 A1 | 7/2016 | Centonza et al. | |
| 2017/0105162 A1* | 4/2017 | Kim | ............... H04W 72/042 |
| 2018/0234890 A1* | 8/2018 | Shih | .................. H04W 60/00 |
| 2018/0270778 A1* | 9/2018 | Bharatia | ............. H04L 65/1073 |
| 2019/0215863 A1* | 7/2019 | Kim | .................. H04W 36/0027 |

FOREIGN PATENT DOCUMENTS

| | | |
|---|---|---|
| CN | 105228229 A | 1/2016 |
| CN | 107959983 A | 4/2018 |
| WO | WO-2007051421 A | 10/2007 |
| WO | WO-2017204539 A1 | 11/2017 |

OTHER PUBLICATIONS

ZTE Corporation et al., "CN Area Update in INACTIVE State", 3GPP TSG-RAN WG2 Meeting#101 R2-1802038, Feb. 15, 2018 (Feb. 15, 2018), section 2.2.2.

Korean Office Action for Application No. 10-2020-7035164, dated Nov. 6, 2021, 19 pages including translation.

LG Electronics Inc., Anchor relocation in RRC_INACTIVE, 3GPP TSG-RAN WG2 Meeting #101 R2-1802512 (Revision of R2-1801353), Athens Greece, Feb. 26-Mar. 2, 2018, 3GPP server publication date (Feb. 14, 2018).

Samsung, "Discussion on pure paging area change if X2 absent", 3GPP Tsg-Ran WG3 #93bis R3-162147, Sophia Antipolis, French, Oct. 10 -14, 2016, 3GPP server publication date (2016.10.01.).

Chinese Office Action for Application No. 201810438746.9, dated Apr. 6, 2022, 23 pages including translation.

Chinese Search Report for Application No. 201810438746.9, dated Mar. 28, 2022, 5 pages including translation.

* cited by examiner

AIR INTERFACE INACTIVE STATE MAINTAINING METHOD AND DEVICE

CROSS-REFERENCES TO RELATED APPLICATIONS

This application is a U.S. National Stage Application, filed under 35 U.S.C. 371, of International Patent Application No. PCT/CN2019/084341, filed on Apr. 25, 2019, which claims a priority to a Chinese patent application No. 201810438746.9 filed on May 9, 2018, disclosure of which are incorporated herein by reference in their entireties.

TECHNICAL FIELD

The present disclosure relates to the field of mobile communications technology and, in particular, to a method for maintaining an air interface inactive state and an apparatus therefor.

BACKGROUND

A 5G system supports single-connectivity (SC) and dual/multiple-connectivity (DC/MC) configuration and operation functions for user equipment (UE). In the SC mode, only one data transmission channel is provided for the UE over each of the air interface and the network-side. In the DC/MC mode, two or more data transmission channels are provided for the UE over each of the air interface and the network-side. For example, in the DC mode, two separate wireless connections (air interface data transmission channels) can be established and maintained between the UE and two NG-RAN base stations simultaneously over the air interface. One base station is referred to as the master base station (master node, MN) and the other base station is referred to as the secondary base station (secondary node, SN). Two separate network-side connections (network data transmission channels) can be established and maintained between the MN and a user-plane network element node UPF of the core network and between the SN and this UPF simultaneously over the NG interfaces. However, only the MN can establish an NG-C connection with a control-plane network element node AMF of the core network and maintain the NG-C connection. The related architecture is shown in FIG. 1. The UE in dual-connectivity configuration and operation can enter the RRC_INACTIVE state. The dual-connectivity operation combined with the RRC_INACTIVE state has the advantage that both the MN and the SN on the network-side can maintain their respective contexts for dual-connectivity communication configuration simultaneously, thereby avoiding the phenomenon where the network-side and the terminal UE fall back to single-connectivity configuration and operation and then may return to dual-connectivity operation through configuration. The related architecture is shown in FIG. 2.

The process for the UE and the network-side to enter and exit from the RRC_INACTIVE state without changing current serving MN and SN for the UE can be supported by a current standard protocol. However, when the UE moves away from the cell coverage of the current serving MN and SN, for example, when the MN performs handover or the SN changes, maintaining the UE in the RRC_INACTIVE state cannot be supported effectively by the current standard protocol.

SUMMARY

To solve the preceding problem, the present disclosure provides a method for maintaining an air interface inactive state and an apparatus therefor, to effectively support maintaining a UE in the RRC_INACTIVE state.

To solve the preceding technical problem, the present disclosure provides a method for maintaining an air interface inactive state. The method includes receiving an RRC uplink notification message sent by a UE, where the RRC uplink notification message carries information notifying that the UE is out of coverage of a serving cell under a source secondary node; performing, based on the RRC uplink notification message, a migration operation of a related high-level configuration of a PDU session anchored to the source secondary node by the UE, where a migration target node is a target secondary node or a current master node; and sending an RRC downlink reply message to the UE after performing the migration operation of the high-level configuration, where the RRC downlink reply message carries migration operation completion indication information; and maintaining the UE in a dual-connectivity or single-connectivity air interface inactive state.

The present disclosure further provides a method for maintaining an air interface inactive state. The method includes: performing, in case of being in the air interface inactive state and based on RRM measurement configuration information of a source secondary node and a master node, air interface RRM measurements on candidate target serving cells at the source secondary node and the master node to determine a current mobile environment; sending an RRC uplink notification message to the master node in response to sensing an update event of wireless coverage of the source secondary node through the air interface RRM measurements, where the RRC uplink notification message carries information notifying that a UE is out of coverage of a serving cell under the source secondary node; and receiving an RRC downlink reply message sent by the master node, where the RRC downlink reply message carries migration operation completion indication information.

The present disclosure further provides a method for maintaining an air interface inactive state. The method includes receiving a context information release message sent by a master node; and releasing locally stored source secondary node-side UE context information based on the received context information release message.

The present disclosure further provides a method for maintaining an air interface inactive state. The method includes receiving a secondary node notification message sent by a master node, where the secondary node notification message includes source secondary node-side UE context information; and locally storing the received source secondary node-side UE context information on a target secondary node, to complete an operation of migrating UE context information between different secondary nodes.

The present disclosure further provides an apparatus for maintaining an air interface inactive state. The apparatus is disposed on a base station and includes a first receiving unit, a migration configuration unit and a first sending unit.

The first receiving unit is configured to receive an RRC uplink notification message sent by a UE. The RRC uplink notification message carries information notifying that the UE is out of coverage of a serving cell under a source secondary node.

The migration configuration unit is configured to: perform, based on the RRC uplink notification message, a migration operation of a related high-level configuration of a PDU session anchored to the source secondary node by the UE, where a migration target node is a target secondary node or a current master node; and maintain the UE in a dual-connectivity or single-connectivity air interface inactive state.

The first sending unit is configured to send an RRC downlink reply message to the UE after the migration operation of the high-level configuration is performed. The RRC downlink reply message carries migration operation completion indication information.

The present disclosure further provides an apparatus for maintaining an air interface inactive state. The apparatus is disposed on a user equipment (UE) and includes a measurement unit, a second sending unit and a second receiving unit.

The measurement unit is configured to perform, in case of being in the air interface inactive state and based on RRM measurement configuration information of a source secondary node and a master node, air interface RRM measurements on candidate target serving cells at the source secondary node and the master node to determine a current mobile environment.

The second sending unit is configured to send an RRC uplink notification message to the master node in response to sensing an update event of wireless coverage of the source secondary node through the air interface RRM measurements. The RRC uplink notification message carries information notifying that the UE is out of coverage of a serving cell under the source secondary node.

The second receiving unit is configured to receive an RRC downlink reply message sent by the master node. The RRC downlink reply message carries migration operation completion indication information.

The present disclosure further provides an apparatus for maintaining an air interface inactive state. The apparatus is disposed on a base station and includes a third receiving unit and a release unit.

The third receiving unit is configured to receive a context information release message sent by a master node.

The release unit is configured to release locally stored source secondary node-side UE context information based on the received context information release message.

The present disclosure further provides an apparatus for maintaining an air interface inactive state. The apparatus is disposed on a base station and includes a fourth receiving unit and a storage unit.

The fourth receiving unit is configured to receive a secondary node notification message sent by a master node. The secondary node notification message includes source secondary node-side UE context information.

The storage unit is configured to locally store the received source secondary node-side UE context information on a target secondary node, to complete an operation of migrating UE context information between different secondary nodes.

The present disclosure further provides an electronic device. The electronic device includes a memory, a processor, and a computer program stored on the memory and executable by the processor. The processor performs any method for maintaining an air interface inactive state provided in the present disclosure when executing the computer program.

The present disclosure further provides a computer-readable storage medium storing a computer program. Any method for maintaining an air interface inactive state provided in the present disclosure is performed when the computer program is executed by a processor.

Compared with the related art, the solution provided in the present disclosure includes: receiving an RRC uplink notification message sent by a UE, where the RRC uplink notification message carries information notifying that the UE is out of coverage of a serving cell under a source secondary node; performing, based on the RRC uplink notification message, a migration operation of a related high-level configuration of a PDU session anchored to the source secondary node by the UE, where a migration target node is a target secondary node or a current master node; and sending an RRC downlink reply message to the UE after performing the migration operation of the high-level configuration, where the RRC downlink reply message carries migration operation completion indication information; and maintaining the UE in a dual-connectivity or single-connectivity air interface inactive state. With this solution, for the UE in dual-connectivity configuration and inactive state, when the secondary node changes, the MN can timely know that the UE moves from the source secondary node to the coverage of the serving cell under the target secondary node, or know that the UE moves away from the source secondary node but does not enter a new target secondary node, and the UE context information stored on the source secondary node can be timely transferred to the target secondary node or the master node or deleted. In this manner, it is ensured that the network-side connection state and the related high-level configuration are maintained in consistence with the latest moving state of the UE, thereby providing a solution which effectively supports maintaining the UE in the RRC_INACTIVE state.

BRIEF DESCRIPTION OF DRAWINGS

Drawings in embodiments of the present disclosure are described below. The drawings in the embodiments are used for a further understanding of the present disclosure and for explaining the present disclosure in conjunction with the description, rather than limiting the scope of the present disclosure.

DETAILED DESCRIPTION

Figure 1:
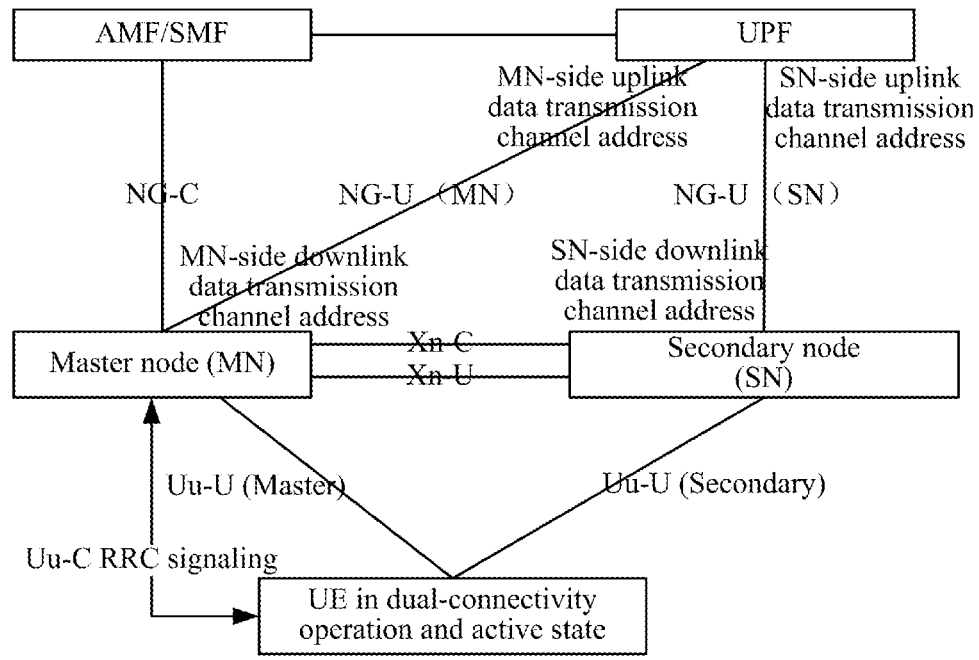
FIG. 1 is an architecture diagram for an active terminal UE in dual-connectivity operation.
Figure 2:
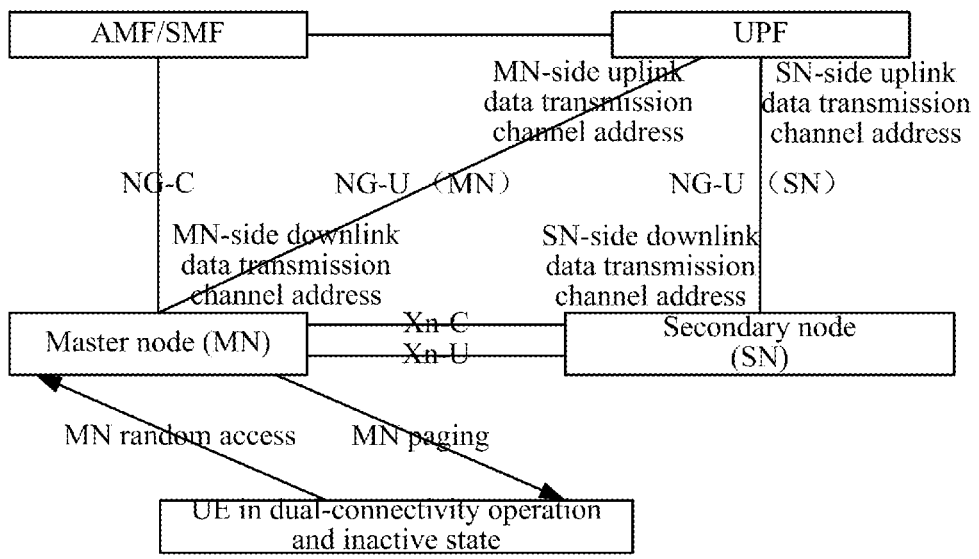
FIG. 2 is an architecture diagram for an inactive terminal UE in dual-connectivity operation.
Figure 3:
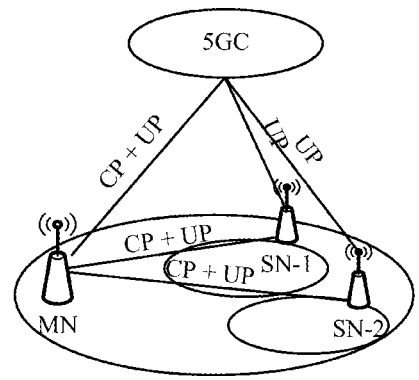
FIG. 3 illustrates that a dual-connected inactive UE moves from cell coverage of SN-1 to cell coverage of SN-2.
Figure 4:
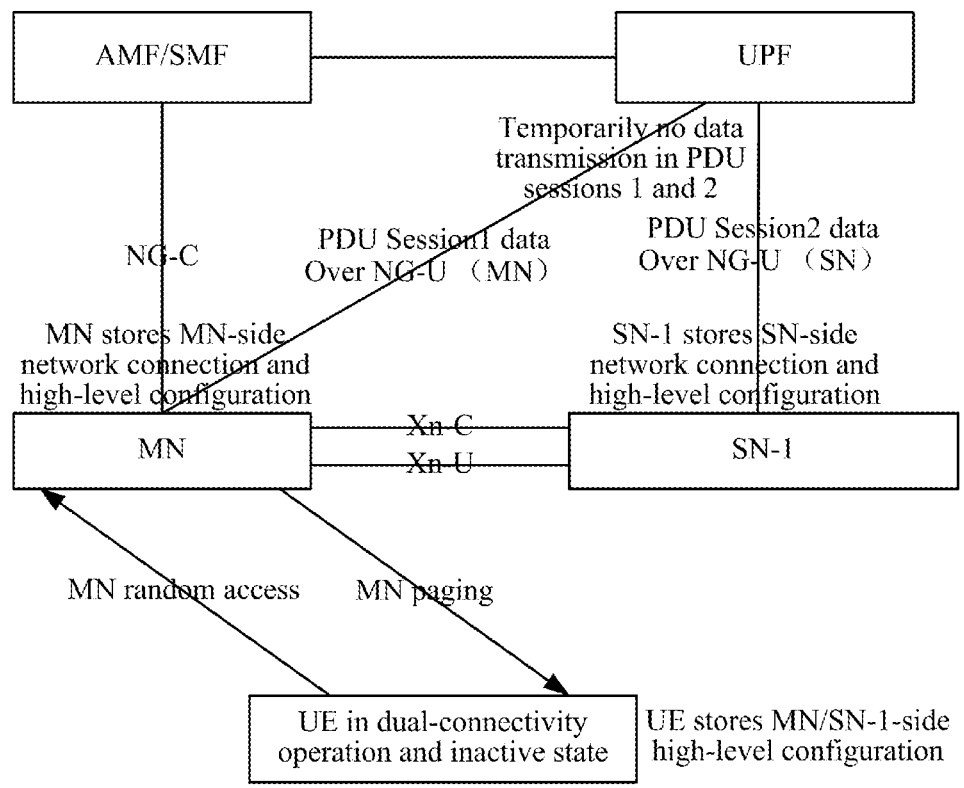
FIG. 4 is an architecture diagram for a dual-connected inactive UE at a source SN-1.
Figure 5:
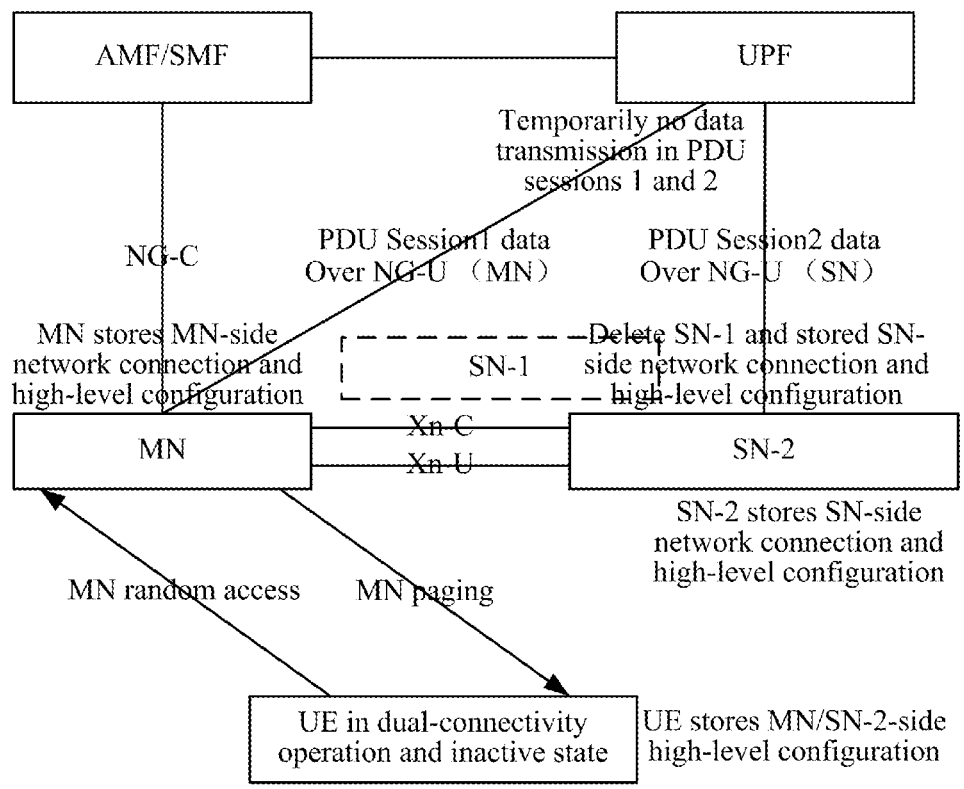
FIG. 5 is an architecture diagram for a dual-connected inactive UE at a new target SN-2.

To facilitate a better understanding by those skilled in the art, a further description of the present disclosure is provided below with reference to drawings. The further description below is not intended to limit the scope of the present disclosure. It is to be noted that if not in collision, the embodiments and various methods therein in the present application may be combined with each other.

The present disclosure provides a method for maintaining an air interface inactive state. The method includes the steps below.

In step 011, an RRC uplink notification message sent by a UE is received. The RRC uplink notification message carries information notifying that the UE is out of coverage of a serving cell under a source secondary node.

The RRC uplink notification message is RRC Connection Resume Request or another applicable RRC uplink message.

The RRC uplink notification message is an uplink message that can be transmitted between the UE in the air interface inactive state and the network-side.

In an example, the RRC uplink notification message includes a P-I-RNTI allocated by a master node to the UE, context index information S-I-RNTI allocated by SgNB1 to the UE, an identifier (ID) of a new serving cell under SgNB2, and secondary node update indication information. In the embodiment of the present disclosure, the secondary node update indication information may be carried in a resumption cause value. For example, it is set that: resumption cause value=SN change.

In another example, the RRC uplink notification message includes an S-I-RNTI allocated by SgNB1 to the UE, an ID of a new serving cell under SgNB2, and secondary node update indication information.

The master node is a master node corresponding to the UE, SgNB1 is a source secondary node, and SgNB2 is a target secondary node. That is, SgNB1 is a secondary node corresponding to the UE before the position of the UE is switched, and SgNB2 is a secondary node corresponding to the UE after the position of the UE is switched.

In step 012, a migration operation of a related high-level configuration of a PDU session anchored to the source secondary node by the UE is performed based on the RRC uplink notification message. A migration target node is a target secondary node or a current master node.

Step 012 includes the steps below.

In step 0121, the master node determines, based on the received ID of the new serving cell under SgNB2, that the UE moves to a serving cell corresponding to the ID of the new serving cell under SgNB2.

In step 0122, the master node acquires SgNB1-side UE context.

In one manner, in a case where the SgNB1-side UE context is stored on the master node, the master node finds the stored SgNB1-side UE context through indexing based on the S-I-RNTI information.

In another manner, the master node initiates a UE context acquisition process to the source secondary node SgNB1. The process includes the steps below.

In step 0122a, the master node sends a context information request message to the source secondary node SgNB1. The context information request message carries the S-I-RNTI information. The S-I-RNTI information includes related UE context index information on SgNB1. Optionally, the context information request message is Retrieve UE Context Request.

The master node initiates the UE context acquisition process to the source secondary node SgNB1 through an Xn interface.

In step 0122b, the master node receives a context information response message responded by the source secondary node SgNB1. The context information response message carries SgNB1-side UE context information originally stored on SgNB1. Optionally, the context information response message is Retrieve UE Context Response.

In step 0123, the master node sends a secondary node notification message to the target secondary node SgNB2. The secondary node notification message includes SgNB1-side UE context information corresponding to the source SgNB1.

In step 0124, the master node receives a secondary node notification acknowledgement message sent by the target secondary node SgNB2. The secondary node notification acknowledgement message includes SgNB2-side downlink transmission address information for bearing PDU session 2.

In the embodiment of the present disclosure, optionally, the secondary node notification message is SN Addition Request, and the secondary node notification acknowledgement message is SN Addition Request ACK.

In step 0125, the master node initiates a PDU session resource modification indication process to an AMF/SMF.

This step includes that the master node sends the AMF/SMF a PDU session resource modification indication information which carries node-side downlink transmission address information for bearing a migrated PDU session.

In step 0126, the master node sends a context information release message to the source SgNB1 to enable SgNB1 to release the originally stored SgNB1-side UE context information based on the context information release message. The context information release message may be UE Context Release.

In step 013, an RRC downlink reply message carrying migration operation completion indication information is sent to the UE, and the UE is maintained in a dual-connectivity or single-connectivity air interface inactive state.

The RRC downlink reply message is RRC Connection Resume Reject or another applicable RRC downlink message. The RRC downlink notification message is a downlink message that can be transmitted from the network-side to the UE in the air interface inactive state.

The RRC downlink reply message includes new S-I-RNTI information and SN update completion indication information. In the embodiment of the present disclosure, the SN update completion indication information may be carried in a rejection cause value. For example, it is set that: rejection cause value=SN Change Done.

In a case where the master node allocates a new P-I-RNTI to the UE, the RRC downlink reply message further includes the allocated new P-I-RNTI.

In step 014, when the UE is required to switch to a dual-connectivity active state, the master node enables the UE to resume the dual-connectivity active state. For example, when uplink user data, downlink user data or downlink control data arrives at the UE and is to be transmitted, the UE is required to switch to the dual-connectivity active state.

Based on the same or similar concept as the preceding embodiment, the present disclosure provides a method for maintaining an air interface inactive state. The method includes the steps below.

In step 021, a master node receives an RRC uplink notification message sent by a UE.

The RRC uplink notification message is RRC Connection Resume Request or another applicable RRC uplink message.

In an example, the RRC uplink notification message includes a P-I-RNTI allocated by the master node to the UE, an S-I-RNTI allocated by SgNB1 to the UE, and secondary node release indication information. In the embodiment of the present disclosure, the secondary node release indication information may be carried in a resumption cause value. For example, it is set that: resumption cause value=SN Release.

In another example, the RRC uplink notification message includes an S-I-RNTI allocated by SgNB1 to the UE and a resumption cause value, where resumption cause value=SN Release.

The master node is a master node corresponding to the UE. SgNB1 is a source secondary node. After a handover, the UE has no corresponding secondary node cell.

In step 022, the master node determines that the UE moves to a serving cell corresponding to an ID of a new serving cell under SgNB2.

Based on the received resumption cause value=SN Release, the master node determines that the UE moves out of a serving cell under SgNB1.

In step 023, the master node acquires SgNB1-side UE context.

In one manner, in a case where the SgNB1-side UE context is stored on the master node, the master node finds the stored SgNB1-side UE context through indexing based on the S-I-RNTI information.

In another manner, the master node initiates a UE context acquisition process to the source secondary node SgNB1. The process includes the steps below.

In step 023a, the master node sends a context information request message to the source secondary node SgNB1. The context information request message carries the S-I-RNTI information. The S-I-RNTI information includes related UE context index information on SgNB1.

The master node initiates the UE context acquisition process to the source secondary node SgNB1 through an Xn interface.

In step 023b, the master node receives a context information response message responded by the source secondary node SgNB1. The context information response message carries SgNB1-side UE context information which is originally stored on SgNB1.

In step 026, the master node sends an RRC downlink reply message to the UE.

The RRC downlink reply message is RRC Connection Resume Reject or another applicable RRC downlink message.

The RRC downlink reply message includes SN release completion indication information. In the embodiment of the present disclosure, the SN release completion indication information may be carried in a rejection cause value. For example, it is set that; rejection cause value=SN Release Done.

In a case where the master node allocates a new P-I-RNTI to the UE, the RRC downlink reply message further includes the allocated new P-I-RNTI. Alternatively, in a case where the master node allocates no new P-I-RNTI to the UE, the RRC downlink reply message further includes the P-I-RNTI which is previously allocated to the UE.

In step 027, the master node initiates a PDU session resource modification indication process to an AMF/SMF.

This step includes that the master node sends the AMF/SMF a PDU session resource modification indication information which carries downlink transmission address information for bearing PDU session 2. The downlink address is newly configured by the master node to bear PDU session 2.

Optionally, the PDU session resource modification indication information is PDU Session Resource Modify Indication.

In step 028, the master node sends a UE Context Release message to the source SgNB1 to enable SgNB1 to release the originally stored SgNB1-side UE context information based on the UE Context Release message.

In step 029, when the UE is required to switch to a dual-connectivity active state, the master base station enables the UE to resume the dual-connectivity active state. For example, when uplink user data, downlink user data or downlink control data arrives at the UE and is to be transmitted, the UE is required to switch to the dual-connectivity active state.

Based on the same or similar concept as the preceding embodiments, an embodiment of the present disclosure provides a method for maintaining an air interface inactive state. The method includes the steps below.

In step 031, a UE sends an RRC uplink notification message to a master node. The RRC uplink notification message is RRC Connection Resume Request or another applicable RRC uplink message.

In an example, the RRC uplink notification message includes a P-I-RNTI allocated by the master node to the UE, an S-I-RNTI allocated by SgNB1 to the UE, an identifier (ID) of a new serving cell under SgNB2, and a resumption cause value=SN change.

In another example, the RRC uplink notification message includes an S-I-RNTI allocated by SgNB1 to the UE, an ID of a new serving cell under SgNB2, and a resumption cause value=SN change.

The master node is a master node corresponding to the UE, SgNB1 is a secondary node corresponding to the UE before the position of the UE is switched, and SgNB2 is a secondary node corresponding to the UE after the position of the UE is switched.

In step 032, the UE receives an RRC downlink reply message sent by the master node. The RRC downlink reply message is RRC Connection Resume Reject or another applicable RRC downlink message. The RRC downlink reply message includes new S-I-RNTI information and a rejection cause value=SN Change Done.

In a case where the master node allocates a new P-I-RNTI to the UE, the RRC downlink reply message further includes the allocated new P-I-RNTI.

In step 033, when the UE is required to switch to a dual-connectivity active state, the UE sends RRC Connection Resume Request to the master node.

In an example, the RRC Connection Resume Request or another applicable RRC uplink message includes the P-I-RNTI allocated by the master node to the UE, the S-I-RNTI allocated by SgNB1 to the UE, and UL data Arriving.

Based on the same or similar concept as the preceding embodiments, an embodiment of the present disclosure provides a method for maintaining an air interface inactive state. The method includes the steps below.

In step 041, a UE sends an RRC uplink notification message to a master node. The RRC uplink notification message is RRC Connection Resume Request or another applicable RRC uplink message.

In an example, the RRC uplink notification message includes a P-I-RNTI allocated by the master node to the UE, an S-I-RNTI allocated by SgNB1 to the UE, and a resumption cause value=SN Release.

In another example, the RRC uplink notification message includes an S-I-RNTI allocated by SgNB1 to the UE and a resumption cause value=SN Release.

The master node is a master node corresponding to the UE, SgNB1 is a secondary node corresponding to the UE before the position of the UE is switched, and SgNB2 is a secondary node corresponding to the UE after the position of the UE is switched.

In step 042, the UE receives an RRC downlink reply message sent by the master node. The RRC downlink reply message is RRC Connection Resume Reject or another applicable RRC downlink message. The RRC downlink reply message includes a rejection cause value=SN Change Done.

Optionally, the RRC downlink reply message further includes the P-I-RNTI allocated by the master node to the UE.

In step 043, when the UE is required to switch to a dual-connectivity active state, the UE sends RRC Connection Resume Request or another applicable RRC uplink message to the master node.

In an example, the RRC Connection Resume Request or another applicable RRC uplink message includes the P-I-RNTI allocated by the master node to the UE, the S-I-RNTI allocated by SgNB1 to the UE, and UL data Arriving.

Based on the same or similar concept as the preceding embodiments, an embodiment of the present disclosure provides a method for maintaining an air interface inactive state. The method includes the steps below.

In step 051, a source secondary node SgNB1 receives a context information request message sent by a master node. The context information request message carries S-I-RNTI information. The S-I-RNTI information includes related UE context index information on SgNB1.

The source secondary node SgNB1 receives, through an Xn interface, a UE context acquisition process initiated by the master node.

In step 052, the source secondary node SgNB1 responds a context information response message to the master node. The context information response message carries SgNB1-side UE context information which is originally stored on SgNB1.

In step 053, the source secondary node SgNB1 receives a UE Context Release message sent by the master node.

In step 054, based on the received UE Context Release message, SgNB1 releases the locally stored SgNB1-side UE context information.

Based on the same or similar concept as the preceding embodiments, the present disclosure provides a method for maintaining an air interface inactive state. The method includes the steps below.

In step 061, a target secondary node SgNB2 receives a secondary node notification message sent by a master node. The secondary node notification message includes SgNB1-side UE context information corresponding to a source SgNB1.

In step 062, the target secondary node SgNB2 locally stores the received SgNB1-side UE context information.

In step 063, the target secondary node SgNB2 sends a secondary node notification acknowledgement message to the master node. The secondary node notification acknowledgement message includes SgNB2-side downlink transmission address information for bearing PDU session 2.

Description is provided below in conjunction with specific implementation scenarios.

Embodiment One

Figure 6:
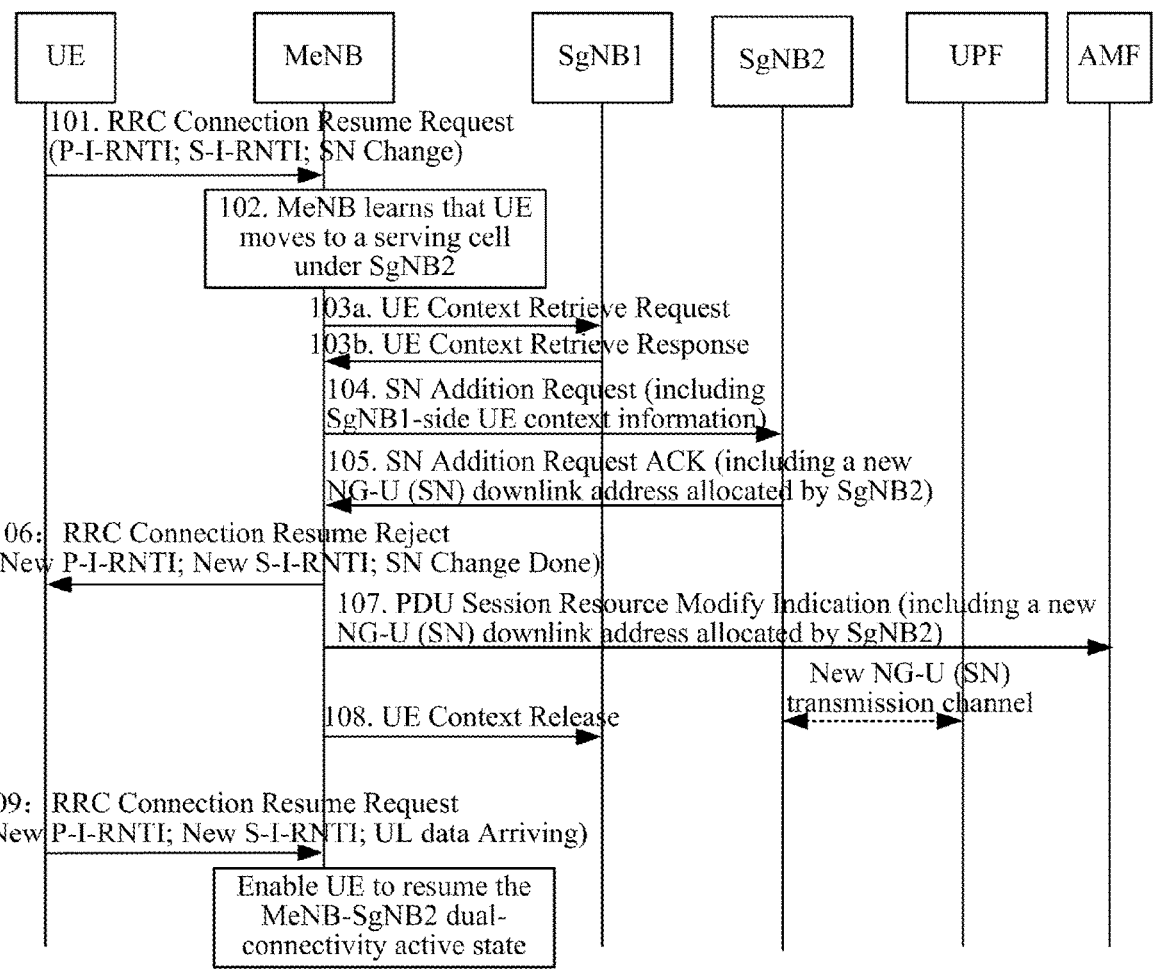
FIGS. 6, 7, 8 and 9 are each a flowchart of a method for maintaining an air interface inactive state according to an embodiment of the present disclosure.

FIG. 6 shows a process as follows. A UE is in a dual-connectivity mode with MeNB and SgNB1. PDU session 1 is anchored and established on the MeNB. PDU session 2 is anchored and established on SgNB1. At a certain moment, the user data of PDU sessions 1 and 2 is suspended temporarily, and the MeNB decides to reconfigure the UE to be in an RRC_INACTIVE state through an air interface suspend process, thereby releasing MCG Radio Link, SCG Radio Link, and low-level radio configuration. The MeNB stores NG-C and NG-U (MN) network connections and PDU-session-1-related high-level configuration. SgNB1 stores NG-U (SN) network connection and PDU-session-2-related high-level configuration. The UE stores PDU-session-1-related high-level configuration and PDU-session-2-related high-level configuration.

In step 101, the UE is in dual-connectivity configuration and RRC_INACTIVE state and continues performing RRM radio measurements on inter-frequency points where candidate target secondary nodes are deployed. After the UE performs measurements and finds that it has entered a new target secondary node SgNB2, the UE triggers an RRC connection resumption process at the air interface Uu and initiates an RRC Connection Resume Request or another applicable RRC uplink message. The RRC Connection Resume Request or another applicable RRC uplink message includes P-I-RNTI and S-I-RNTI information previously allocated by the MeNB/SgNB1 to the UE, an identifier (ID) of a new serving cell under SgNB2, and a resumption cause value=SN change.

The P-I-RNTI information includes an ID of the source MeNB and index information of MeNB-side UE context stored on the MeNB.

The S-I-RNTI information includes an ID of the source SgNB1 and index information of SgNB1-side UE context stored on SgNB1.

In step 102, after the MeNB receives the RRC Connection Resume Request or another applicable RRC uplink message, the MeNB-side UE context information (that is, MeNB-side network connection and related high-level configuration) stored on the MeNB can be found through indexing based on the P-I-RNTI information; the SgNB1-side UE context information (that is, SgNB1-side network connection and related high-level configuration) stored on SgNB1 can be found through indexing based on the S-I-RNTI information; and the MeNB learns, based on the resumption cause value=SN change reported by the UE, that the SN of the UE changes from SgNB1 to SgNB2, and the MeNB learns, based on the ID of the new serving cell under SgNB2, that the UE has moved to the coverage of a certain serving cell under SgNB2.

In step 103, the MeNB initiates a UE context acquisition process to the source secondary node SgNB1 through the Xn interface and initiates a Retrieve UE Context Request message through the Xn interface, where the S-I-RNTI information includes related UE context index information on SgNB1; and the source secondary node SgNB1 responds with a Retrieve UE Context Response message in response to the Retrieve UE Context Request message and sends the SgNB1-side UE context information originally stored on SgNB1 to the MeNB.

In step 104, the MeNB initiates an SN establishment process to the target secondary node SgNB2 through the Xn interface and initiates an SN Addition Request message through the Xn interface. The SN Addition Request message includes the SgNB1-side UE context information originally stored on the source SgNB1 so that this context information is sent to and stored on SgNB2. Based on this context information, SgNB2 learns that SgNB2 is required to bear PDU session 2 (which is originally born by SgNB1) and related context configuration. Note: Due to the inactive state, establishment of SCG low-level radio configuration is not required for SgNB2, and SgNB2 just continues storing SN-side UE network connection and related high-level configuration.

In step 105, SgNB2 initiates an SN Addition Request ACK message to the MeNB through the Xn interface. The SN Addition Request ACK message includes SgNB2-side downlink transmission address information for bearing PDU session 2. Based on the SN-side context information forwarded by the MeNB, SgNB2 learns an original UPF-side uplink transmission address of PDU session 2. An NG-U (SN) network connection (NG-U data transmission channel) is then established between SgNB2 and the UPF. An Xn network connection is then established between SgNB2 and the MN.

In step 106, the MeNB initiates an RRC Connection Resume Reject message or another applicable RRC downlink message to the UE through the air interface Uu. The RRC Connection Resume Reject message or another applicable RRC downlink message includes new P-I-RNTI information and new S-I-RNTI information allocated by the MeNB to the UE and includes a rejection cause value=SN Change Done.

In step 107, the MeNB initiates a PDU Session Resource Modify Indication process to an AMF/SMF through the NG-C interface and provides the UPF with the SgNB2-side downlink transmission address information for bearing PDU session 2 which is just allocated by SgNB2, and then a new NG-U (SN) network connection (NG-U data transmission channel) is established between SgNB2 and the UPF.

In step 108, the MeNB initiates a UE context release process to the source SgNB1 through the Xn interface and initiates a UE Context Release message through the Xn interface. Based on this message, SgNB1 releases the originally-stored SgNB1-side UE context information subsequently.

In step 109, when uplink user data arrives at the UE and is to be transmitted, the UE initiates an RACH process to the MeNB, indicates DRB ID or QoS flow ID information related to the uplink user data, and tries to resume the RRC_ACTIVE state.

Embodiment Two

Figure 7:
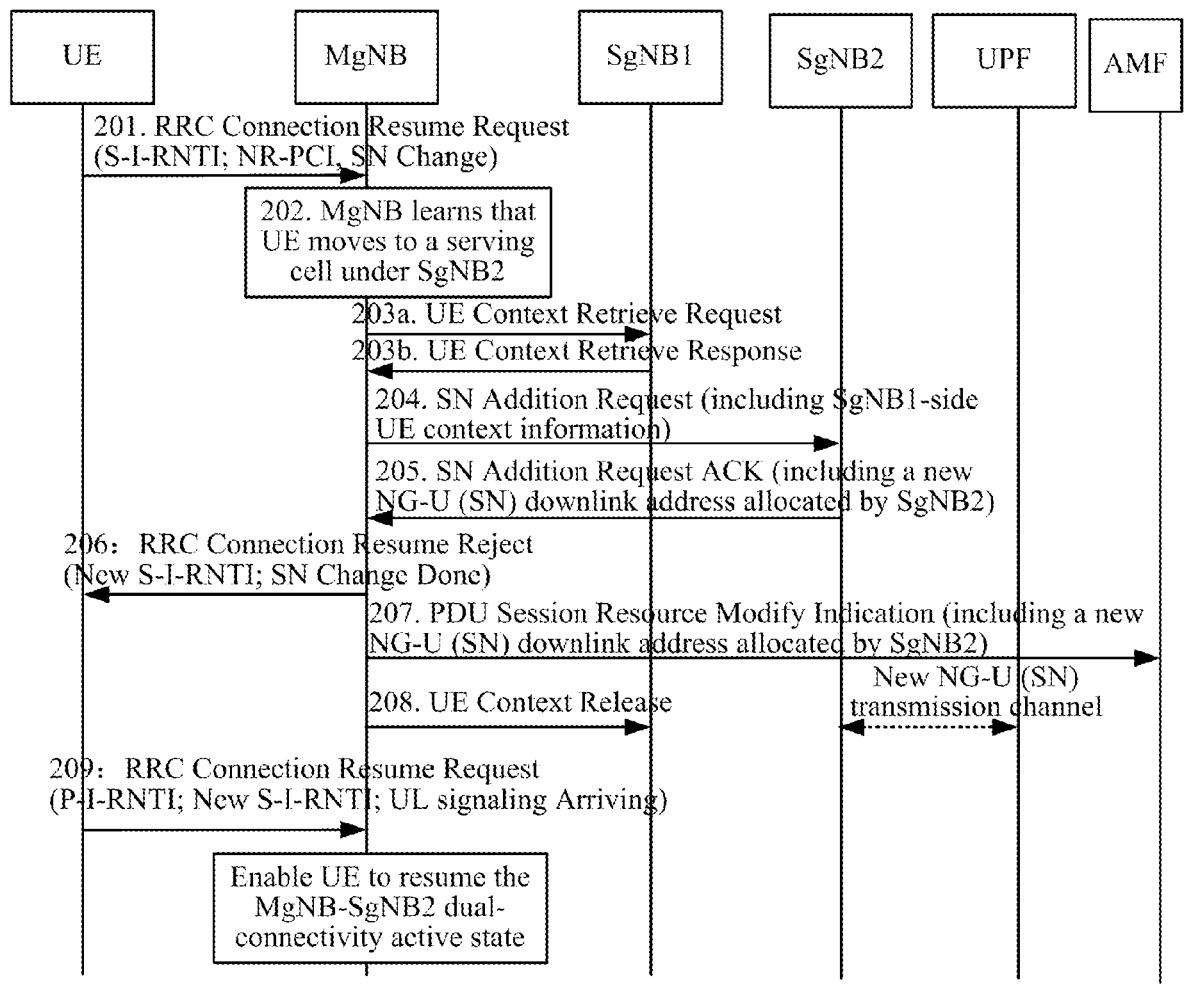

FIG. 7 shows a process as follows. A UE is in a dual-connectivity mode with MgNB and SgNB1. PDU session 1/2 is anchored and established on the MgNB. PDU session 3/4 is anchored and established on SgNB1. At a certain moment, the user data of PDU sessions 1/2 and 3/4 is suspended temporarily, and the MgNB decides to reconfigure the UE to be in the RRC_INACTIVE state through an air interface suspend process, thereby releasing MCG Radio Link, SCG Radio Link, and low-level radio configuration. The MgNB stores NG-C and NG-U (MN) network connections and PDU session 1/2-related high-level configuration. SgNB1 stores NG-U (SN) network connection and PDU session 3/4-related high-level configuration. The UE stores PDU session 1/2/3/4-related high-level configuration.

In step 201, the UE is in dual-connectivity configuration and RRC_INACTIVE state and continues performing RRM radio measurements on inter-frequency points where candidate target secondary nodes are deployed. After the UE performs measurements and finds that it has entered a new target secondary node SgNB2, the UE triggers an RRC connection resumption process at the air interface Uu and initiates an RRC Connection Resume Request message or another applicable RRC uplink message at the air interface. The RRC Connection Resume Request message or another applicable RRC uplink message includes S-I-RNTI information previously allocated by the MgNB/SgNB1 to the UE (P-I-RNTI information is not reported temporarily since the UE does not leave coverage of a serving cell under the MgNB), a new serving cell physical layer identifier (NR-PCI) under SgNB2, and a resumption cause value=SN change.

The S-I-RNTI information includes an ID of the source SgNB1 and index information of SgNB1-side UE context stored on SgNB1.

In step 202, after the MgNB receives the RRC Connection Resume Request message or another applicable RRC uplink message, the SgNB1-side UE context information (that is, SgNB1-side network connection and related high-level configuration) stored on SgNB1 can be found through indexing based on the S-I-RNTI information; and the MgNB learns, based on the resumption cause value=SN change reported by the UE, that the SN of the UE changes from SgNB1 to SgNB2, and the MgNB learns, through a network management address matching query based on the NR-PCI under SgNB2, that the UE has moved to the coverage of a certain serving cell under SgNB2.

In step 203, the MgNB initiates a UE context acquisition process to the source secondary node SgNB1 through the Xn interface and initiates a Retrieve UE Context Request message through the Xn interface, where the S-I-RNTI information includes related UE context index information on SgNB1; and the source secondary node SgNB1 responds with a Retrieve UE Context Response message in response to the Retrieve UE Context Request message and sends the SgNB1-side UE context information originally stored on SgNB1 to the MgNB.

In step 204, the MgNB initiates an SN establishment process to a new target secondary node SgNB2 through the Xn interface and initiates an SN Addition Request message through the Xn interface. The SN Addition Request message includes the SgNB1-side UE context information originally stored on the source SgNB1 so that this context information is sent to and stored on SgNB2. Based on this context information, SgNB2 learns that SgNB2 is required to bear PDU session 3/4 (which is originally born by SgNB1) and related context configuration. Note: Due to the inactive state, establishment of SCG low-level radio configuration is not required for SgNB2, and SgNB2 just continues storing SN-side UE network connection and related high-level configuration.

In step 205, SgNB2 initiates an SN Addition Request ACK message to the MgNB through the Xn interface. The SN Addition Request ACK message includes SgNB2-side downlink transmission address information for bearing PDU session 3/4. Based on the SN-side context information forwarded by the MgNB, SgNB2 learns an original UPF-side uplink transmission address of PDU session 3/4. An NG-U (SN) network connection (NG-U data transmission channel) is then established between SgNB2 and the UPF. An Xn network connection is then established between SgNB2 and the MN.

In step 206, the MgNB initiates an RRC Connection Resume Reject message or another applicable RRC downlink message to the UE through the air interface Uu. The RRC Connection Resume Reject message or another applicable RRC downlink message includes new S-I-RNTI information allocated by the MgNB to the UE and includes a rejection cause value=SN Change Done.

In step 207, the MgNB initiates a PDU Session Resource Modify Indication process to an AMF/SMF through the NG-C interface and provides the UPF with the SgNB2-side downlink transmission address information for bearing PDU session 3/4 which is just allocated by SgNB2, and then a new NG-U (SN) network connection (NG-U data transmission channel) is established between SgNB2 and the UPF.

In step 208, the MgNB initiates a UE context release process to the source SgNB1 through the Xn interface and initiates a UE Context Release message through the Xn interface. Based on this message, SgNB1 releases the originally-stored SgNB1-side UE context information subsequently.

In step 209, when uplink control signaling arrives at the UE and is to be transmitted, the UE initiates an RACH process to the MgNB, indicates DRB ID or QoS flow ID information related to the uplink user data, and tries to resume the RRC_ACTIVE state.

Embodiment Three

Figure 8:
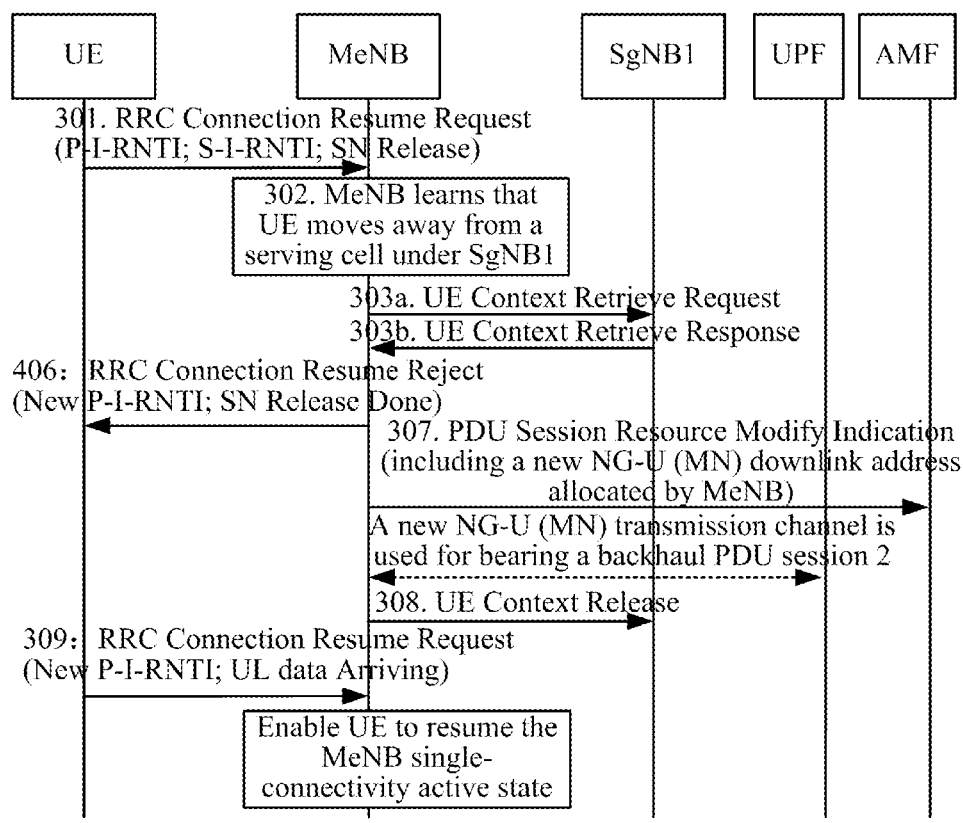

FIG. 8 shows a process as follows. A UE is in a dual-connectivity mode with MeNB and SgNB1. PDU session 1 is anchored and established on the MeNB. PDU session 2 is anchored and established on SgNB1. At a certain moment, the user data of PDU sessions 1 and 2 is suspended temporarily, and the MeNB decides to reconfigure the UE to be in the RRC_INACTIVE state through an air interface suspend process, thereby releasing MCG Radio Link, SCG Radio Link, and low-level radio configuration. The MeNB stores NG-C and NG-U (MN) network connections and PDU session 1-related high-level configuration. SgNB1 stores NG-U (SN) network connection and PDU session 2-related high-level configuration. The UE stores PDU session 1-related high-level configuration and PDU session 2-related high-level configuration.

In step 301, the UE is in dual-connectivity configuration and RRC_INACTIVE state and continues performing RRM radio measurements on inter-frequency points where candidate target secondary nodes are deployed. After the UE performs measurements and finds that it has left the serving coverage of SgNB1 but has not entered the serving coverage of a new target secondary node SgNB2, the UE triggers an RRC connection resumption process at the air interface Uu and initiates an RRC Connection Resume Request message or another applicable RRC uplink message at the air interface. The RRC Connection Resume Request message or another applicable RRC uplink message includes P-I-RNTI and S-I-RNTI information previously allocated by the MeNB/SgNB1 to the UE, an identifier (ID) of a new serving cell under SgNB2, and a resumption cause value=SN Release.

The P-I-RNTI information includes an ID of the MeNB and index information of MeNB-side UE context stored on the MeNB.

The S-I-RNTI information includes an ID of the source SgNB1 and index information of SgNB1-side UE context stored on SgNB1.

In step 302, after the MeNB receives the RRC Connection Resume Request message or another applicable RRC uplink message, the MeNB-side UE context information (that is, MeNB-side network connection and related high-level configuration) stored on the MeNB can be found through indexing based on the P-I-RNTI information; the SgNB1-side UE context information (that is, SgNB1-side network connection and related high-level configuration) stored on SgNB1 can be found through indexing based on the S-I-RNTI information; and the MeNB learns, based on the resumption cause value=SN Release reported by the UE, that the UE has left the serving coverage of the source secondary node SgNB1.

In step 303, the MeNB initiates a UE context acquisition process to the source secondary node SgNB1 through the Xn interface and initiates a Retrieve UE Context Request message through the Xn interface, where the S-I-RNTI information includes related UE context index information on SgNB1; and the source secondary node SgNB1 responds with a Retrieve UE Context Response message in response to the Retrieve UE Context Request message and sends the SgNB1-side UE context information originally stored on SgNB1 to the MeNB.

In step 304, since the UE has not entered the serving coverage of the new target secondary node SgNB2, the MeNB is not required to initiate an SN establishment process to the new target secondary node SgNB2 through the Xn interface.

In step 305, establishment of an Xn network connection is not required temporarily between SgNB2 and the MN.

In step 306, the MeNB initiates an RRC Connection Resume Reject message or another applicable RRC downlink message to the UE through the air interface Uu. The RRC Connection Resume Reject message or another applicable RRC downlink message includes new P-I-RNTI information allocated by the MeNB to the UE and includes a rejection cause value=SN Release Done.

In step 307, the MeNB initiates a PDU Session Resource Modify Indication process to an AMF/SMF through the NG-C interface and provides the UPF with downlink transmission address information for bearing a backhaul PDU session 2 which is just allocated by MeNB, and then a new NG-U (MN) network connection (NG-U data transmission channel) is established between the MeNB and the UPF.

In step 308, the MeNB initiates a UE context release process to the source SgNB1 through the Xn interface and initiates a UE Context Release message through the Xn interface. Based on this message, SgNB1 releases the originally-stored SgNB1-side UE context information subsequently.

In step 309, when uplink user data arrives at the UE and is to be transmitted, the UE initiates an RACH process to the MeNB, indicates DRB ID or QoS flow ID information related to the uplink user data, and tries to resume the RRC_ACTIVE state.

Embodiment Four

Figure 9:
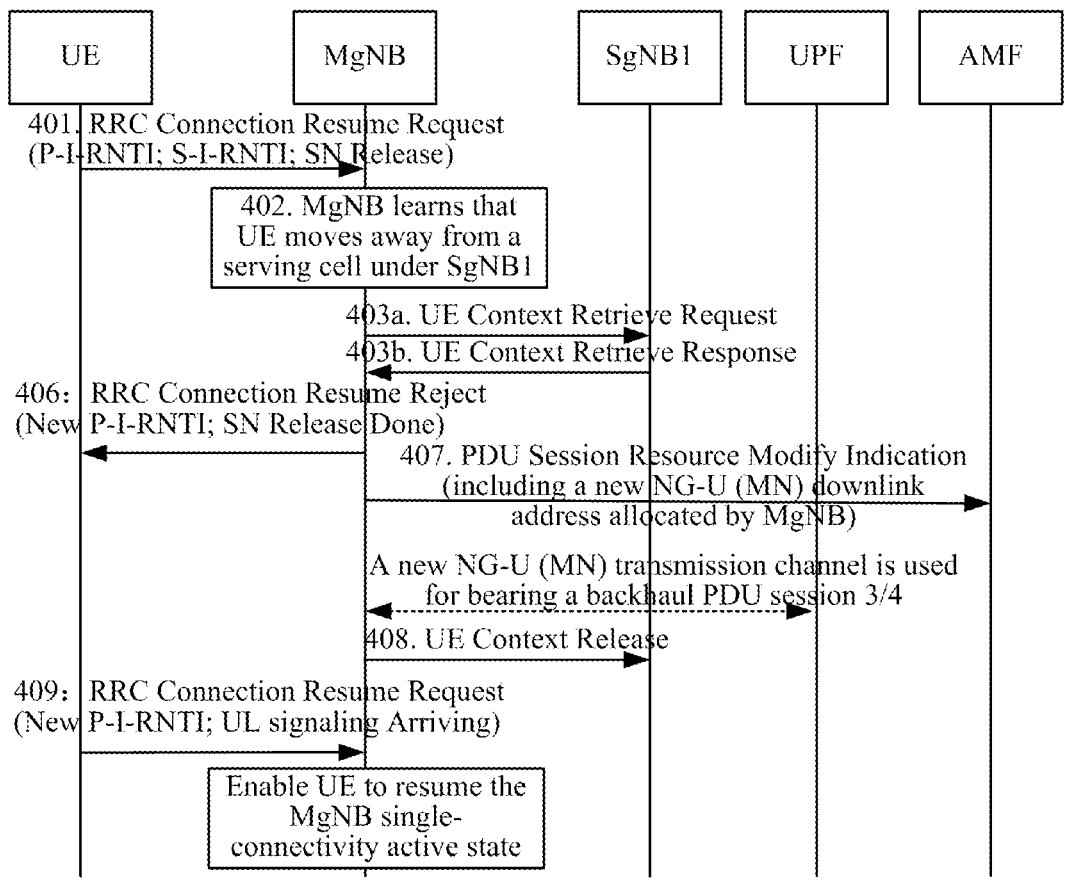

FIG. 9 shows a process as follows. A UE is in a dual-connectivity mode with MgNB and SgNB1. PDU session 1/2 is anchored and established on the MgNB. PDU session 3/4 is anchored and established on SgNB1. At a certain moment, the user data of PDU sessions 1/2 and 3/4 is suspended temporarily, and the MgNB decides to reconfigure the UE to be in the RRC_INACTIVE state through an air interface suspend process, thereby releasing MCG Radio Link, SCG Radio Link, and low-level radio configuration. The MgNB stores NG-C and NG-U (MN) network connections and PDU session 1/2-related high-level configuration. SgNB1 stores NG-U (SN) network connection and PDU session 3/4-related high-level configuration. The UE stores PDU session 1/2/3/4-related high-level configuration.

In step 401, the UE is in dual-connectivity configuration and RRC_INACTIVE state and continues performing RRM radio measurements on inter-frequency points where candidate target secondary nodes are deployed. After the UE performs measurement and finds that it has left the serving coverage of SgNB1 but has not entered the serving coverage of a new target secondary node SgNB2, the UE triggers an RRC connection resumption process at the air interface Uu and initiates an RRC Connection Resume Request message or another applicable RRC uplink message at the air interface. The RRC Connection Resume Request message or another applicable RRC uplink message includes P-I-RNTI and S-I-RNTI information previously allocated by the MgNB/SgNB1 to the UE, and a resumption cause value=SN Release.

The P-I-RNTI information includes an ID of the MgNB and index information of MgNB-side UE context stored on the MgNB.

The S-I-RNTI information includes an ID of the source SgNB1 and index information of SgNB1-side UE context stored on SgNB1.

In step 402, after the MgNB receives the RRC Connection Resume Request message or another applicable RRC uplink message, the MgNB-side UE context information (that is, MgNB-side network connection and related high-level configuration) stored on the MgNB can be found through indexing based on the P-I-RNTI information; the SgNB1-side UE context information (that is, SgNB1-side network connection and related high-level configuration) stored on SgNB1 can be found through indexing based on the S-I-RNTI information; and the MgNB learns, based on the resumption cause value=SN Release reported by the UE, that the UE has left the serving coverage of the source secondary node SgNB1.

In step 403, the MgNB initiates a UE context acquisition process to the source secondary node SgNB1 through the Xn interface and initiates a Retrieve UE Context Request message through the Xn interface, where the S-I-RNTI information includes related UE context index information on SgNB1; and the source secondary node SgNB1 responds with a Retrieve UE Context Response message in response to the Retrieve UE Context Request message and sends the SgNB1-side UE context information originally stored on SgNB1 to the MgNB.

In step 404, since the UE has not entered the serving coverage of the new target secondary node SgNB2, the MgNB is not required to initiate an SN establishment process to the new target secondary node SgNB2 through the Xn interface.

In step 405, establishment of an Xn network connection is not required temporarily between SgNB2 and the MN.

In step 406, the MgNB initiates an RRC Connection Resume Reject message or another applicable RRC downlink message to the UE through the air interface Uu. The RRC Connection Resume Reject message or another applicable RRC downlink message includes new P-I-RNTI information allocated by the MgNB to the UE and includes a rejection cause value=SN Release Done.

In step 407, the MgNB initiates a PDU Session Resource Modify Indication process to an AMF/SMF through the NG-C interface and provides the UPF with downlink transmission address information for bearing a backhaul PDU session 3/4 which is just allocated by MgNB, and then a new NG-U (MN) network connection (NG-U data transmission channel) is established between the MgNB and the UPF.

In step 408, the MgNB initiates a UE context release process to the source SgNB1 through the Xn interface and initiates a UE Context Release message through the Xn interface. Based on this message, SgNB1 releases the originally-stored SgNB1-side UE context information subsequently.

In step 409, when uplink control signaling arrives at the UE and is to be transmitted, the UE initiates an RACH process to the MgNB, indicates DRB ID or QoS flow ID information related to the uplink user data, and tries to resume the RRC_ACTIVE state.

Based on the same or similar concept as the preceding embodiments, an embodiment of the present disclosure provides an apparatus for maintaining an air interface inactive state. The apparatus is disposed on a base station and includes a first receiving unit, a migration configuration unit and a first sending unit.

The first receiving unit is configured to receive an RRC uplink notification message sent by a UE. The RRC uplink notification message carries information notifying that the UE is out of coverage of a serving cell under a source secondary node.

The migration configuration unit is configured to: perform, based on the RRC uplink notification message, a migration operation of a related high-level configuration of a PDU session anchored to the source secondary node by the UE, where a migration target node is a target secondary node or a current master node; and maintain the UE in a dual-connectivity or single-connectivity air interface inactive state.

The first sending unit is configured to send an RRC downlink reply message to the UE after the migration operation of the high-level configuration is performed. The RRC downlink reply message carries migration operation completion indication information.

In the embodiment of the present disclosure, the RRC uplink notification message is RRC Connection Resume Request, and the RRC downlink reply message is RRC Connection Resume Reject.

In the embodiment of the present disclosure, the migration configuration unit further includes a context acquisition module. The context acquisition module is configured to acquire source secondary node-side UE context information after the RRC uplink notification message sent by the UE is received.

The context acquisition module acquires the source secondary node-side UE context information in a manner below.

The context acquisition module finds, through indexing based on context index information, the source secondary node-side UE context information stored locally by the master node.

Alternatively, the context acquisition module sends the source secondary node a context information request message which carries related UE context index information on the source secondary node, and then the master node receives a context information response message sent by the source secondary node. The context information response message carries the source secondary node-side UE context information stored on the source secondary node and found by the source secondary node based on the UE context index information.

In the embodiment of the present disclosure, the RRC uplink notification message includes context index information allocated by the source secondary node to the UE and secondary node release indication information.

In the embodiment of the present disclosure, the RRC uplink notification message further includes at least one of a P-I-RNTI allocated by the master node to the UE, an S-I-RNTI allocated by the master node to the UE, or UE RRM measurement result information.

In the embodiment of the present disclosure, the migration configuration unit further includes a context notification module. The context notification module is configured to, after the source secondary node-side UE context information is acquired, send a secondary node notification message to the target secondary node based on an ID of a new serving cell under the target secondary node reported by the UE. The secondary node notification message includes the source secondary node-side UE context information.

In the embodiment of the present disclosure, the migration configuration unit further includes an address acquisition module. The address acquisition module is configured to, after the secondary node notification message is sent to the target secondary node, receive a secondary node notification acknowledgement message sent by the target secondary node. The secondary node notification acknowledgement message includes node-side downlink transmission address information for bearing a migrated PDU session anchored to a secondary node.

In the embodiment of the present disclosure, the migration configuration unit further includes an address configuration module. The address configuration module is configured to reconfigure master node-side downlink transmission address information for bearing the migrated PDU session.

In the embodiment of the present disclosure, the migration configuration unit further includes a network-side update module. The network-side update module is configured to send an AMF/SMF a PDU session resource modification indication message which carries the node-side downlink transmission address information for bearing the migrated PDU session.

In the embodiment of the present disclosure, the migration configuration unit further includes a release module. The release module is configured to send a context information release message to the source secondary node to enable the source secondary node to release locally stored source secondary node-side UE context information in response to the context information release message.

In the embodiment of the present disclosure, the RRC downlink reply message includes context index information corresponding to target secondary node-side UE context information and includes secondary node update completion indication information.

In the embodiment of the present disclosure, the RRC downlink reply message includes secondary node release completion indication information.

Based on the same or similar concept as the preceding embodiments, an embodiment of the present disclosure provides an apparatus for maintaining an air interface inactive state. The apparatus is disposed on a user equipment (UE) and includes a measurement unit, a second sending unit and a second receiving unit.

The measurement unit is configured to perform, in case of being in the air interface inactive state and based on RRM measurement configuration information of a source secondary node and a master node, air interface RRM measurements on candidate target serving cells at the source secondary node and the master node to determine a current mobile environment.

The second sending unit is configured to send an RRC uplink notification message to the master node in response to sensing an update event of wireless coverage of the source secondary node through the air interface RRM measurements. The RRC uplink notification message carries information notifying that the UE is out of coverage of a serving cell under the source secondary node.

The second receiving unit is configured to receive an RRC downlink reply message sent by the master node. The RRC downlink reply message carries migration operation completion indication information.

In the embodiment of the present disclosure, in a case where the update event is that the wireless coverage of the secondary node is updated to a target secondary node, the RRC uplink notification message includes an S-I-RNTI allocated by the source secondary node to the UE, an identifier (ID) of a new serving cell under the target secondary node, and secondary node update indication information; and the RRC downlink reply message includes new S-I-RNTI information and secondary node update completion indication information.

In the embodiment of the present disclosure, in a case where the update event is that the wireless coverage of the secondary node disappears, the RRC uplink notification message includes an S-I-RNTI allocated by the source secondary node to the UE and secondary node release indication information; and the RRC downlink reply message includes secondary node release completion indication information.

In the embodiment of the present disclosure, the RRC uplink notification message further includes a P-I-RNTI or S-I-RNTI allocated by the master node to the UE and UE RRM measurement result information.

Based on the same or similar concept as the preceding embodiments, an embodiment of the present disclosure provides an apparatus for maintaining an air interface inactive state. The apparatus is disposed on a base station, especially a source secondary node, and includes a third receiving unit and a release unit.

The third receiving unit is configured to receive a context information release message sent by a master node.

The release unit is configured to release locally stored source secondary node-side UE context information in response to the received context information release message.

In the embodiment of the present disclosure, before receiving the context information release message sent by the master node, the third receiving unit is further configured to receive a context information request message sent by the master node. The context information request message carries related UE context index information on the source secondary node.

The apparatus for maintaining the air interface inactive state further includes a third sending unit and an address searching unit. The address searching unit is configured to acquire, based on the UE context index information, locally stored source secondary node-side UE context information corresponding to the UE context index information. The third sending unit is configured to send a context information response message to the master node. The context information response message carries source secondary node-side UE context information stored on the source secondary node.

Based on the same or similar concept as the preceding embodiments, an embodiment of the present disclosure provides an apparatus for maintaining an air interface inactive state. The apparatus is disposed on a base station, especially a target secondary node, and includes a fourth receiving unit and a storage unit.

The fourth receiving unit is configured to receive a secondary node notification message sent by a master node. The secondary base station notification message includes source secondary node-side UE context information.

The storage unit is configured to locally store the received source secondary node-side UE context information on a target secondary node. The apparatus is further configured to complete an operation of migrating UE context information between different secondary nodes.

In the embodiment of the present disclosure, the apparatus further includes a fourth sending unit. The fourth sending unit is configured to, after the secondary node notification message sent by the master node is received, send a secondary node notification acknowledgement message to the master node. The secondary node notification acknowledgement message includes secondary node-side downlink transmission address information for bearing a PDU session anchored to a secondary node.

Based on the same or similar concept as the preceding embodiments, an embodiment of the present disclosure provides a base station. The base station includes at least one of an apparatus for maintaining an air interface inactive state disposed on a master node, an apparatus for maintaining an air interface inactive state disposed on a source secondary node, or an apparatus for maintaining an air interface inactive state disposed on a target secondary node.

Based on the same or similar concept as the preceding embodiments, an embodiment of the present application further provides an electronic device. The electronic device includes a memory, a processor, and a computer program stored on the memory and executable by the processor. The processor performs any method for maintaining an air interface inactive state provided in embodiments of the present disclosure when executing the computer program.

Based on the same or similar concept as the preceding embodiments, an embodiment of the present application further provides a computer-readable storage medium storing a computer program. Any method for maintaining an air interface inactive state provided in embodiments of the present disclosure is performed when the computer program is executed by a processor.

It is to be noted that the preceding embodiments are provided only for ease of understanding by those skilled in the art and are not intended to limit the scope of the present disclosure, and any apparent substitutions, improvements or the like made by those skilled in the art to the present disclosure without departing from the concept of the present disclosure fall within the scope of the present disclosure.

INDUSTRIAL APPLICABILITY

With the solution provided in embodiments of the present disclosure, the following effect is achieved. For the UE in dual-connectivity configuration and inactive state, when the secondary node changes, the MN can timely know that the UE moves from the source secondary node to the coverage of the serving cell under the target secondary node, or know that the UE moves from the source secondary node but does not enter a new target secondary node, and the UE context information stored on the source secondary node can be timely transferred to the target secondary node or the master node or deleted. In this manner, it is ensured that the network-side connection state and the related high-level configuration are maintained in consistence with the latest moving state of the UE, thereby providing a solution which effectively supports maintaining the UE in the RRC_INACTIVE state.

What is claimed is:

1. A method for maintaining an air interface inactive state, applied to a base station, comprising:
receiving an RRC uplink notification message sent by a UE, wherein the RRC uplink notification message carries information notifying that the UE is out of coverage of a serving cell under a source secondary node;
performing, based on the RRC uplink notification message, a migration operation of a related high-level configuration of a PDU session anchored to the source secondary node by the UE, wherein a migration target node is a target secondary node or a current master node; and
sending an RRC downlink reply message to the UE after performing the migration operation of the high-level configuration, wherein the RRC downlink reply message carries migration operation completion indication information; and maintaining the UE in a dual-connectivity or single-connectivity air interface inactive state, wherein the performing the migration operation of the related high-level configuration of the PDU session anchored to the source secondary node by the UE comprises:
acquiring source secondary node-side UE context information,
wherein the acquiring the source secondary node-side UE context information comprises:
finding, based on context index information and through indexing, source secondary node-side UE context information which is stored locally by the master node.

2. The method for maintaining the air interface inactive state of claim 1, wherein the RRC uplink notification message is an RRC Connection Resume Request message; and the RRC downlink reply message is an RRC Connection Resume Reject message.

3. The method for maintaining the air interface inactive state of claim 1, wherein
the RRC uplink notification message comprises context index information allocated by the source secondary node to the UE, an identifier (ID) of a new serving cell under the target secondary node, and secondary node update indication information.

4. The method for maintaining the air interface inactive state of claim 3, wherein the RRC uplink notification message further comprises a P-I-RNTI or S-I-RNTI allocated by the master node to the UE and UE RRM measurement result information.

5. The method for maintaining the air interface inactive state of claim 3, wherein after acquiring the source secondary node-side UE context information, the performing the migration operation of the related high-level configuration of the PDU session anchored to the source secondary node by the UE further comprises:
sending a secondary node notification message to the target secondary node based on the ID of the new serving cell under the target secondary node reported by the UE, wherein the secondary node notification message comprises the source secondary node-side UE context information.

6. The method for maintaining the air interface inactive state of claim 5, wherein after sending the secondary node notification message to the target secondary node, the method further comprises:
receiving a secondary node notification acknowledgement message sent by the target secondary node, wherein the secondary node notification acknowledgement message comprises node-side downlink transmission address information for bearing a migrated PDU session anchored to a secondary node.

7. The method for maintaining the air interface inactive state of claim 6, wherein
the performing the migration operation of the related high-level configuration of the PDU session anchored to the source secondary node by the UE further comprises:
sending an AMF/SMF a PDU session resource modification indication message which carries node-side downlink transmission address information for bearing the migrated PDU session.

8. The method for maintaining the air interface inactive state of claim 3, wherein the RRC downlink reply message comprises context index information corresponding to target secondary node-side UE context information and comprises secondary node update completion indication information.

9. The method for maintaining the air interface inactive state of claim 1, wherein the RRC uplink notification message comprises context index information allocated by the source secondary node to the UE and secondary node release indication information.

10. The method for maintaining the air interface inactive state of claim 9, wherein the performing the migration operation of the related high-level configuration of the PDU session anchored to the source secondary node by the UE further comprises:
   reconfiguring master node-side downlink transmission address information for bearing a migrated PDU session.

11. The method for maintaining the air interface inactive state of claim 9, wherein the RRC downlink reply message comprises secondary node release completion indication information.

12. The method for maintaining the air interface inactive state of claim 1, wherein the performing the migration operation of the related high-level configuration of the PDU session anchored to the source secondary node by the UE further comprises:
   sending a context information release message to the source secondary node to enable the source secondary node to release the locally stored source secondary node-side UE context information based on the context information release message.

13. An electronic device, comprising a memory, a processor, and a computer program stored on the memory and executable by the processor, wherein the processor performs the method of claim 1 when executing the computer program.

* * * * *